United States Patent [19] [11] 4,252,910
Schaefer [45] Feb. 24, 1981

[54] MATERIAL FOR RESILIENT, CONFORMING PADS, CUSHIONS, SUPPORTS OR THE LIKE AND METHOD

[76] Inventor: Philipp Schaefer, Schackstrasse 10, Hanover, Fed. Rep. of Germany

[21] Appl. No.: 884,161

[22] Filed: Mar. 7, 1978

Related U.S. Application Data

[63] Continuation-in-part of Ser. No. 769,691, Feb. 17, 1977, abandoned, which is a continuation of Ser. No. 475,942, Jun. 3, 1974, abandoned.

[30] Foreign Application Priority Data

Jul. 16, 1973 [DE] Fed. Rep. of Germany ....... 2336136

[51] Int. Cl.[3] ....................... C08L 27/08; C08L 23/22
[52] U.S. Cl. ....................................... 521/145; 36/71; 36/117; 260/33.6 UA; 525/1
[58] Field of Search ................ 260/2.5 B; 36/117, 71; 521/145

[56] References Cited

U.S. PATENT DOCUMENTS

| | | | |
|---|---|---|---|
| 2,797,201 | 6/1957 | Veatch et al. | 260/2.5 |
| 3,237,319 | 3/1966 | Hanson | 36/2.5 |
| 3,402,411 | 9/1968 | Hanson | 12/142 |
| 3,407,406 | 10/1968 | Werner et al. | 36/71 X |
| 3,582,503 | 6/1971 | Horne | 260/2.5 |
| 3,593,435 | 7/1971 | Lange | 36/71 X |
| 3,615,972 | 10/1971 | Morehouse et al. | 156/79 |
| 3,635,849 | 1/1972 | Hanson | 260/2.5 B |
| 3,882,561 | 5/1975 | Hanson et al. | 12/142 P |

*Primary Examiner*—Wilbert J. Briggs, Sr.
*Attorney, Agent, or Firm*—Karl F. Ross

[57] ABSTRACT

A material for use in resilient conforming pads, cushions and the like and cushions filled with such material as described. The material comprises elastic gas-filled hollow microparticles cohered to a mass by a thermoplastic bonding agent semi-liquid at body temperature. The material is useful for providing contour-conforming resilient padding for garments, athletic equipment, prosthetic devices, surgical or vehicular cushions and the like. The gas-filled hollow particles each have a resilient gas-impermeable thermoplastic shell enclosing a quantity of a gas.

4 Claims, No Drawings

MATERIAL FOR RESILIENT, CONFORMING PADS, CUSHIONS, SUPPORTS OR THE LIKE AND METHOD

RELATED APPLICATIONS

This application is a continuation-in-part of copending application Ser. No. 769,691 filed 17 Feb. 1977 as a continuation of Ser. No. 475,942 which was filed June 3, 1974, both now abandoned.

FIELD OF THE INVENTION

This invention relates to resilient filling material for conforming pads, cushions and the like, to such pads and cushions and to methods for conforming them to the body contours. More particularly, this invention relates to conforming pads and cushions of gas-filled hollow microparticles cohered in a mass by a thermoplastic bonding agent. The invention provides contour-conforming resilient padding for garments, athletic equipment, prosthetic devices, surgical or vehicular cushions and the like.

BACKGROUND OF THE INVENTION

Until now there has been no completely satisfying solution to the problem of comfortably conforming hard enclosures to the shapes of the portions of the human body enclosed therein. Similarly, such conformations within rigid enclosures make it difficult to simultaneously cushion the supported portion of the human body, as is required when adapting outer shells of ski boots and the like, which consist of rigid cured or thermoset synthetic-resin polymers conforming them to the contours of the enclosed feet while cushioning the feet against shocks.

Similar problems are encountered in connection with shoes, trusses, corsets, girdles, protective helmets and junctures between prosthetics and prosthetic appliances and the human body. Particularly of interest are the cushions required for the resilient connection between artificial limbs and the portions of the body to which they are applied.

It has been known to adapt ski boots and shoes to the foot by pouring into the cavity between the foot and the shoe a silicone rubber and vulcanizing or curing the silicone rubber in the presence of the foot (U.S. Pat. No. 3,325,919). Cushions produced in this manner have the drawback that once the silicone rubber has been vulcanized, the resultant hardened rubber is inalterable in shape and is quite heavy.

It also has been proposed to fill the cavities between rigid articles such as ski boots and the feet, with packets or envelopes filled with hard microspheres of a thermosetting material which are covered with a lubricating agent (U.S. Pat. No. 3,407,406, German Published patent applications DT-OS 1,485,772 and DT-OS 2,211,718). Such microsphere packets essentially are filled with incompressible phenolic resin hollow balls. Such cushions will assume a shape conforming to the shape of the cushioned body portions but have been found not to provide sufficient yielding in their support because such cushions cannot be reversibly or elastically compressed as is, for instance, the case with soft synthetic foamed material. Thus it becomes necessary to additionally interpose a soft foamed material between the packets of microspheres and the body part.

It has further been proposed to fill the cavities between the rigid enclosure and the body part with cushions, packets and similar enclosures of a pasty and semi-liquid thixotropic substance having a high viscosity such as a polyisobutylene containing mixed therein a large proportion of solid filler material (German Published patent application DT-OS 1,685,307). However, the cushioning effect of such enclosures is insufficient because the solid filling material within such cushions cannot be reversibly compressed when subjected to dynamic pressure. Thus, when such materials are used, an additional cushioning layer such as a foam, possessing sufficient compressibility must similarly be included or interposed.

It has also been proposed to utilize foamed-in-situ polyurethane foams, thereby providing the required adaptation of the filling material to the existing cavity between the rigid enclosure and the body part (German patent DT-PS 901,471). Such proposals suffer from the drawback that the individual adaptation, by definition, must be effected in situ and is objectionable, both because of the toxicity of isocyanates used in the manufacture of the foams and the reaction heat liberated during the foaming process.

Further, misadaptations often occur which, because of the irreversible nature of the reaction, cannot be readily corrected.

Another drawback to the use of foamed-in-place materials is the low resistance of polyurethane foams to sweat and its hydrolysis by moisture. This low resistance within a short period of use time destroys the elasticity of the polyurethane foam and leads to its degradation. It thus can no longer serve its intended purpose.

It has also been proposed to fill packets or cushions with shredded particles of soft elastic foams. These particles in the shape of leaves or slices have great specific surface (German published patent application DT-OS 1,010,825). The desired permanent individual adaptation by this procedure to the shapes of the body cannot be effected for any extended period of use, because the foamed material is neither thermoplastic nor thermoelastic, and the loose particles within the packets or cushions tend to shift position during dynamic use and lose contour conformation. Furthermore, as is the nature of such foams, the cushions are subject to deterioration by perspiration and moisture hydrolysis within the packets as a result of contact with the body.

It has also been proposed to fill cushions or packets with extruded fillings in the shape of a rope, cord, tow or string fashioned from foamed thermoplastic or thermosetting material. Such cushions similarly do not effect a permanent adaptation to the body parts and in addition it has been found that the support is insufficiently elastic or resilient as regards support during shock for the body parts.

It has also been suggested to replace the foamed polyurethane with foamed polystyrene in the form of chips, granules or powders for filling cushions and mattresses. Such foamed polystyrene rapidly loses its elasticity after repeated exposure to stress over extended periods of time and due to such fatigue loss of elasticity, it cannot serve for extended use.

It has likewise been suggested to use hollow microspheres and similar hollow particles as filler materials to provide low-density products. These microspheres have been suggested for use as fillers in such substrates as linoleum and floor tiles or in aggregates such as concrete and plaster. As described in U.S. Pat. No.

2,797,201, these are rigid articles and the microspheres therein serve to provide a filling action. This patent describes hollow particles being adhered together to produce solid, cellular-type materials and/or rigid honeycomb core materials for various structural, decorative or special purpose panels. These microspheres, loose or bound together are enclosed within rigid skins such as plywood, metal, plastic laminates and other similar rigid face materials.

It has further been suggested that these materials, due to their hollow structure, be loose-poured into location, packed under pressure and sealed in situ to provide a static fill-type thermal insulation.

OBJECT OF THE INVENTION

It is an object of the present invention to overcome the drawbacks of the prior-art known cushioning materials and to provide pads of a novel material which can be individually adapted to conform to existing body shapes as frequently as desired and which padding material is reversibly compressible to the extent that a shock absorbing elastic support is provided between the enclosure and the body part without additional auxiliary measures.

SUMMARY OF THE INVENTION

The present invention is based upon the principle of providing a pad comprising a material consisting of a cohered mass formed of resilient thermoplastic synthetic-resin hollow particles at least partially formed of small, intact bubbles or microspheres and a bonding agent. The synthetic-resin hollow particles comprise a synthetic polymer having a density of about 0.02 to 0.3 and formed into hollow bubbles consisting of gasfilled, thin, resilient, gas-impermeable shells.

These gas-impermeable shells are formed from a high-molecular-weight flexible copolymer which is specifically gas-impermeable and is in the form of a flexible film defining the shell of the bubble or microsphere, and enclosing therein a pneumatic substance, i.e. any gas to which the shell is impermeable. Due to the flexible shells and gas filling, the bubbles or microsphere of this invention are elastically compressible.

Further, the microspheres containing the gas are cohered to each other by means of a bonding agent which adherently interconnects the surfaces of these microspheres or hollow particles into a semimobile, resilient, coherent, plastically deformable mass, said bonding agent having a softening point which is lower than that of the shell forming copolymer. The bonding agent as a result of its softening point is in a flowable condition at just about body temperature and in addition should exercise little or no plasticizing action on the copolymer forming the resilient shell of the bubbles.

The very small bubbles (less than 1.0 mm) with their thin shells consist of film-forming elastic copolymer, preferably of vinylidene chloride or a film forming elastic copolymer of vinyl chloride. These copolymers are preferred, as they provide gas-impermeable shells for the elastic hollow microballoons. The preferred copolymers of vinylidene chloride consist of the vinylidene copolymerized with acrylonitrile. The vinyl chloride is copolymerized with ethylene. It is recognized in the art that films formed from such copolymers are gas-impermeable.

It has been found that when such microspheres are bound with a binding agent which itself is semifluid, i.e. is only fluid or semifluid above certain temperature ranges; that above such ranges the resultant structure is similar to a foam possessing closed cells. However, as a result of the thermoplastic nature of the structure at temperatures just above the softening point of the binding agent it has a plastic nature and provides a flowability of the bonding agent which permits the structure to adapt and fill the spaces between the rigid support and to confirm to the body part. Further, because of the resilient elastic nature of the microspheres filled with gas, they tend to act as a pneumatic element and provide the reversible elasticity of enclosed pneumatic bodies. Thus after the structure has filled and conformed to the space between the body and the enclosure, there is still provided a shock-cushioning or absorbing effect from the pneumatic nature of the resilient hollow balloons within the bonding matrix.

Further, because of the reversible thermoplasticity of the bonding agent, the shape applied to the filling material need not be permanently maintained but can be varied as necessary or desired so that the filling material can, as frequently as necessary, be adapted to changing body contours in a physiologically unobjectionable manner.

Further, because of the low density of the microspheres or balloons, the resulting mass or structure is of extreme light weight. Due to the chemical inertness of the preferred copolymers, the structures or pads are additionally resistant to the effects of sweat and/or moisture which are normally present in areas where these pads are used.

The padding material of this invention, comprising the resilent hollow discrete microspheres bonded with the thermoplastic binding agent, is particularly suitable for the production of cushions for patients and invalids and also for cushions used at the interface between artificial limbs and similar orthopedic articles and the body. In addition, other cushions can be made for wheelchairs, stretchers, operating tables and the like, as well as for seats, pillows, support and pads used in vehicles, particularly sports cars, aircraft and acceleration tables, couches and chairs such as are used in manned space exploration vehicles. In such use the pads also serve to absorb vibrations. In addition the pads or cushions of this invention may also be utilized for those portions of furniture which must conform to the body for reasons of comfort such as knee cushions, cushions in shoes and boots and for settees or couches. They may also be used for splints and post-operative positioning beds. In addition, these cushions may also be utilized to provide resilient padding for helmets, for swimmers' goggles, and for artificial bosoms as prosthetic devices or as cosmetic fillings for brassieres or the like.

The resultant mass of the present invention may either be used in the form of pads or padding or as fillings within envelopes to form cushions. An advantage of the use of the material as a filling for an envelope or pouch is that the flow of the material is strictly confined to within a given volume defined by the envelope. An additional advantage of the use of the specifically preferred copolymers disclosed above is that in contrast to most other filling materials utilized in cushions such as the polymeric foams of polyurethane or polystyrene, the vinylidene chloride copolymers are essentially noncombustible so that the filling material when used in combination with a nonflammable or noncombustible cushion envelope such as for instance asbestos fabric, provides a useful padding for emergency conditions wherein the noncombustible quality of the pad is of extreme importance.

An example where such qualities are particularly useful is in the case of equipment to be used by firefighters such as fire helmets, and otherwise where shock absorbing, light weight and padding qualities are desired.

In addition, due to the very nature of the hollow microspheres, the material of this invention provides a combination of body-conforming qualities with resilient cushioning, vibration-absorbing, and heat-insulating effects.

It is particularly advantageous to use the copolymers rather than the polymers of the basic monomers of vinyl chloride or vinylidene chloride due to the fact that the copolymers have lower softening points that the homopolymer of the monomers forming the main component of the copolymer.

The gas trapped or enclosed within the bubbles or resilient microspheres, in the simplest case, is preferred to be air. However, for special purposes it may be convenient to use any other gas that is inert to the copolymer and to which the copolymer provides a gas-impermeable container. Due to the fact that other gases than air may be used the term "pneumatic" as used herein refers to any gas which is inert to the shell material. Other gases which may be used are ethylene or other hydrocarbons, halogenated hydrocarbons, nitrogen, or the noble gases including helium and argon. Due to the pneumatic resilience of the individual microspheres, these spheres individually act in a practically perfect elastic manner. After compression, they return to their original shape.

Changes in the general shape of the entire structural mass are due to repositioning of the spheres with relation to each other but while they are still held by the binding agent.

The binding agent is particularly selected to have its initial softening point at or either slightly above or below body temperature. Thus if desired by one aspect of the invention, when the mass of the material is warmed to body temperature or slightly higher than body temperature as by immersing the body-part in water warmer than body temperature, the mass will become plastic and will conform by plastic flow to the shape of the body. When the temperature equalizes to body temperature, the mass will cease to flow but will remain resilient as regards any dynamic motions by the body and will continue to act as a shock absorbent due to the elastic resiliency of the microballoons or microspheres which comprise the major volume of the conforming structure.

The specific binding agent useful in this invention can be any material which can impregnate the interstices between the bubbles in the form of a melt, a solution, an emulsion or a dispersion of materials and have a broad softening range. Suitable materials include low-molecular-weight polymers or copolymers, of natural or synthetic resins and can be modified, as needed, with natural or synthetic waxes or mixtures of the above and substances such as are used for the production of adhesives, adhesive melts and flowable glues.

The melting points for the synthetic polymeric resin materials used for the manufacture of the bubbles, i.e. the copolymers mentioned above, are within the range of about 140° to 195° C. The specific melting points are the function of the degree of copolymerization of the main monomer component and the other copolymeric components and also of the molecular weight of the resulting copolymer. However, it is preferred that the melting point of the polymeric materials from which the resilient microsphere shells are preferably prepared, lie in the range stated above, i.e. 140° to 195° C.

The melting point of the bonding agent should generally lie within the range of 50° to 100° C., i.e. be less than that of the shells, and preferably should be approximately 68° C. The "softening point" where plastic-flow starts of such thermoplastic polymers and copolymers used as the adhesive binding agents of this invention is, of course, much lower and, in general, it is preferred that this softening point be at or about body temperature, preferably slightly above body or below temperature in order that depending upon specific circumstances and uses, the structural material will soften and flow at or above temperature to conform to the body part and to fill the space between the enclosure and the contours of the body part.

In addition, where the material is enclosed within envelopes, the envelope will be flowed to fill the vacant portions between the enclosure and the body part. When the material has cooled to below its softening point the resulting structure will be in conformity with the body part, yet will be resiliently elastic to provide protection during vibration or dynamic movement of the body part and will provide shock resistance to the body part. Thus true cushioning will be attained while having adjustable complete conformity to the body part.

The principal use of the padding and cushioning materials of the present invention is to provide padding or cushioning for conditions in which the mass should not be either completely flowable or inelastic but should be capable of adjusting and conforming to the body contours while maintaining its resiliency. Normally, these two concepts are mutually exclusive, as one can observe from comparing a flexible envelope filled with either a pneumatic fluid such air or a hydraulic fluid such as water or any other relatively perfect liquid. The hydraulic liquid has no intrinsic elasticity and if the envelope is not elastic or is flaccid, any pressure exerted on the envelope by the body contour will result in a change of shape. For this reason it is necessary in a water-bed or other liquid-filled cushion to confine the liquid by limiting the volume of the envelope so that the filling mass has a certain shape in order that when pressure is applied, the liquid either stretches the envelope or is compressed. In the absence of the envelope, the body will, of course, sink into the water until a buoyant state is reached, in the case of water in a waterbed, or will fall to the bottom in the case of air. The fluid itself, however, has no intrinsic elasticity and cannot both conform to the shape of the contour and simultaneously exercise an effective cushioning action.

The problem is particularly pronounced in ski boots or other relatively rigid enclosures for the body. It is solved by using the system in accordance with the present invention in which the microsphere, microballoon or similar gas-filled spheres, which are intrinsically elastic, are cohered together by the cohesive matrix, so as to restrict their mutual relative movement in the absence of body heat but are displaceable in the presence of body heat which renders the cohering agent sufficiently soft to permit such displacement. The envelopes of one aspect of this invention provide supplemental displacement confinement.

The present invention achieves a threefold result. The first is a cushioning or shock-dissipation result which is achieved by the use of the gas-filled bubbles capable of resilient elastic distortion when the cushion mass is placed under shock-like compression. The second result is the relative plastic mobility of the mass only at or about body temperature to allow the mass to adapt to the shape of the body part to which it is applied. The third result is a function of the low density of the component structure and it is the ability of the cushion or pad to retain its shape without free flow to a level sufficient to withstand high static blows.

An example of the effects achieved with the present invention can be seen when one concentrates the body weight on a heel pad containing the filling material of this invention in an envelope. It will not extrude or exude completely from beneath the heel and thus eliminate the cushion effect. The envelope confines the material and thus permits full exercise of the resilient elasticity of the pneumatic spheres which are maintained and confined to the point of greatest pressure by the envelope.

The thermoplastic binding agents of the present invention are preferably low-molecular-weight polymers having a molecular weight range of from about 150 to about 16,000. Preferably the molecular weight should lie in the range of 1000–3000. Among such polymers, preferred are the polyamide and polyisobutylene synthetic polymers within this range. These can be modified or higher molecular weight resins can similarly be modified by the use of appropriate external plasticisers to have melting points within the range of about 68° C. and softening points of about, or just slightly (two or three degrees) above, body temperature.

Most of the known so-called external plasticizers for plastics, varnishes, resins and rubbers will provide the adjustments necessary to modify the polymers for the binding matrix to have the desired softening points as outlined above. Particularly suitable external plasticizers are diethylene glycolphthalate, diisooctyl adipate, dibutylphthalate, dioctylphthalate, dioctyl sebacate, dibutyl adipate, epoxidized oleic acid esters, epoxy-plasticizers having a molecular weight up to 2000, glycerol and polyglycerols, castor oil, as well as many low-molecular-weight polymers having molecular weights up to about 3000, such as the polyesters of adipic acid and ethylene glycol or the polyesters of triols and propylene oxide, polysiloxanes, polyolefines, higher alcohols etc. Their exact nature must be such as to modify the binding agent to provide a proper plastic state whereby it is flowable at body temperature but solid below body temperature.

It will be noted that the above substances combined with the binding agent should have a very low plasticizing activity upon the copolymer which comprises the shells of the microspheres and thus should not interfere with the gas-impermeability of these microspheres. Preferably the cohering binding agent is an adhesion-promoting material which is slightly flowable, plastic or pasty at body temperature and is substantially non-flowable yet resilient below body temperature. Similarly the binding agent has a very slight or no plasticizing action on the material comprising the shell of the bubbles.

For certain application purposes it is convenient that the filling material according to the invention only partially consist of the very small bubbles, microspheres or microballoons having gas impermeable, resilient thin shells and consisting of an elastic vinylidene chloride copolymer or a vinyl chloride copolymer described above and, for the remaining volumetric portion, consist of other synthetic-resin particles. In this aspect of the invention the bubbles are embedded into the bonding polymeric material; in this aspect it is possible to fill into the cushion envelopes as a filling material the microballoons together with larger size individual particles of a foamed material, for example, foamed spherical particles consisting of amorphous synthetic resins having a closed cell structure. The very small particles of the microspheres will then practically completely fill the interstices between the larger particles so that upon application of an external pressure to the mass, the thin shells of the bubbles will be subjected to uniform pressure from all sides. The distributing effect to be observed when using the larger spherical foam particles of amorphous synthetic resins, the microballoons and thin cushion envelopes, i.e. the effect of being marked off on the surface of the cushion envelope in the shape of hucksters is simultaneously counteracted by the very small bubbles.

In addition to the mentioned bubbles, other materials such as fibrous tows, batting, foams, fibers, rubber particles or the like may be used in addition to the synthetic-resin particles as a filling material.

The envelopes or covers for the filling material according to the present invention may, depending upon the intended use, consist of various woven or nonwoven materials such as leather, artificial leather, fabrics, fleeces, textiles, polymeric films or the like. It is preferred that the bubbles be confined or surrounded by a cover element which is at least partially impermeable to air and water.

The filling material according to the present invention can simply be filled into the opening of the cushion envelope when the material is warm, i.e. above body temperature and is thus readily flowable. Upon completion of the fill, the envelope is sealed. It may also be convenient to introduce the microspheres and binding agent into the cushion envelope preferably by means of a liquid carrier through the opening in the cushion envelope. In such circumstances, the filling material can, for example, be introduced into the cushion envelope together with a liquid or gaseous fluid carrier substance by means of a thin tube and in the case of very small paddings, by means of an injection needle as used for medical purposes, noting that the envelope may be pierced at any desired location by means of this hollow needle and later sealed.

After introducing the bubbles into the cushion envelope, the fluid carrier substance conveniently is exhausted or evaporated and the binding agent is introduced via the opening used for introduction which is then properly sealed or closed.

It is particularly advantageous to use as the carrier substance the adhesion-promoting binding agent which will mutually connect and cohere the bubbles or microspheres introduced to form the microfoam capable of conforming to the desired shape. The carrier substance used can, for instance, be a higher alcohol or an epoxy plasticizer.

According to a further feature of the present invention the bubbles may be formed by expanding particles containing an inflating agent or blowing agent. After introducing these particles into the cushion by means of the carrier substance, the agent is activated to form the spheres. The nonfoam particles containing the foaming agent or an inflating agent such as a hydrocarbon, a chlorocarbon or ethylene, may be expanded into the shape of bubbles by means of a heating source to a temperature between +75° C. and +160° C., after having been introduced into the cushion envelopes in a manner according to the invention. For this purpose, liquid baths heated to a temperature between +85° and +110° C. are most suitable in view of their capacity for rapid heat transfer to the nonfoamed particles to be blown and particularly in those cases in which the cushion envelopes used are permeable to the liquids used as the heating medium.

According to this aspect, parts of a normal thickness within the range of 1.5 to 3.5 cm, such as are commonly required for artificial legs or for sports shoes, can be foamed to a finished condition within less than 20 seconds. For partially inflating particles as may be required for larger articles, steam is used in connection with permeable cushion envelopes and/or infrared irradiators which are preferred in connection with impermeable cushion envelopes.

According to a further feature of the invention process, the carrier substance consists of an inert liquid, for example water, preferably being provided with hygroscopic additives. When using water the water may contain a plasticizing compound, for the bonding agent for example, glycerol.

Cushions filled with the filling material according to this invention and also cushions having been filled according to the process of the present invention, provide the advantage of having low specific weight, so that upon dynamic loading, the reduced density has the result also of reduced inertial forces because the kinetic energy and the centrifugal force are directly proportional to the moved mass. The reduced inertial forces have as a result also a reduced wear and a saving in propelling force, so that it is possible to provide a cushion having a simpler and lighter overall design, an advantage which is highly appreciated by persons who wear artificial limbs. The weight advantage is also appreciated by those involved in competitive sports.

A further advantage of cushions filled with filling material according to the invention is in that these cushions behave upon compression in a similar manner to air enclosed in a gastight elastic envelope. This effect results from the fact that the gas-filled bubbles tend, on application of pressure, to laterally yield before finally becoming compressed. This is an intended property with many cushions and this property becomes of great importance when the cushion materials are not impermeable as is required when filling the envelopes with air or liquids, but which can be made of a permeable material and thus can be transpirating.

By varying the type and amount of the adhesion-promoting agent used, it is possible to vary within a wide range the softness, the ease of conformation, reversible compressibility, density and many other properties of the padding and filling materials according to this invention. For a finished cushion volume of about 3,500 $cm^3$, the amount of adhesion-promoting agent is, as a rule, between 65 and 450 g. The filling material according to this invention preferably has a density of from 0.02 to 0.3, but can, in certain cases, also have higher densities, particularly in those cases where in addition to the elastic microbubbles, other polymeric particles of larger size are provided within the filling material or structural strengtheners are included within the cushion.

SPECIFIC EXAMPLES

The following Examples provide insight into combinations of filling materials such as are suitable according to this invention for providing support padding for ski boots.

EXAMPLE 1

| | |
|---|---|
| Polyisobutylene, molecular weight about 6000 | 250 g |
| Microbubbles of the copolymer of polyvinylidene with acrylonitrile having a molecular weight of about 120,000 | 35 g |
| Total weight 285 g | |
| Total volume approx. 1000 $cm^3$. | |

The viscosity of the material in Example 1 is approximately 750,000 poise at 37° C.±2°. The material was filled into knitted packets in semiliquid state and placed within ski boots in volume sufficent to provide a conforming packing between the rigid boot shell and the foot. A similar packet in the shape of a sole is provided underneath the sole surface of the foot to provide an elastic resilient padding thereunder. The foot of the wearer is immersed in warm water (about 40° C.) and then dried. The warm foot is placed into the ski boot and within five minutes the individual side and sole packets have flowed sufficiently to conform to the shape of the foot and to fill the space between the foot and the boot shell.

EXAMPLE 2

| | |
|---|---|
| Polyamide resin (molecular weight about 4500) | 360 g |
| Microballoons | 25 g |
| Total weight of mixture 385 g | |
| Total volume 900 $Cm^3$. | |

The viscosity of the mixture at 37° C. (±2°) is about 750,000 poise. The microspheres used are similar to those used in Example 1, (supra).

About 40 cc of the mixture, warmed slightly above body temperature were flowed onto the sole portion of the ski boot. On this was placed a second single layer textile inner sole. The warmed foot was introduced into the ski boot and the space between the ski boot and the foot was filled with packets as in Example 1 but filled with the mixture according to this example. The boot was then laced and after 15 minutes at body temperature, the packets and the inner sole had conformed to the contours of the foot and filled the voids between the foot and the rigid ski boot.

The boots with contour-conforming linings prepared according to both Examples 1 and 2 were tested and found to be resilient to normal shocks encountered in skiing, yet conform completely during use to the contours of the leg without shifting or binding due to displacement of the lining.

The above examples have been provided to show methods of preparing and utilizing the material of this invention both within envelopes and without envelopes. The procedures of the Examples with appropriate modification may be used to conform artificial limbs to the appropriate body parts. Pads of the mass may also be packed into the body surfaces to be protected and then enclosed by confining layers of fabric to provide conforming pads for post surgical patient positioning.

In the above specification all materials mentioned are exemplary and all art recognized equivalents meeting the recited requirements are intended.

I claim:

1. A conforming padding comprising:

a material consisting of a cohered mass formed of discrete hollow resilient thermoplastic synthetic-resin particles and a bonding agent, said discrete particles having a density of about 0.02 to 0.3, and being formed as resiliently deformable elastically shape-restorative intact hollow microballoons having a thin resilient gas-impermeable shell enclosing and confining a gas, said shell consisting of a high-molecular-weight gas-impermeable copolymer, said bonding agent adherently interconnecting said discrete particles into a mobile, resilient coherent, plastically deformable mass at body temperature, said bonding agent being polyisobutylene with a molecular weight of substantially 3,000 to 7,500 and having a softening point lower than that of said shell copolymer and said bonding agent being flowably plastic at about body temperature and having little plasticizing action on said bubble-forming copolymer, said bonding agent being a thermoplastic polymer having a plastic softening point at or slightly above body temperature, said high-molecular-weight copolymer for forming the gas-impermeable shells being selected from the group of copolymers of vinylidene chloride with acrylonitrile, having a molecular weight in the range of 55,000 to 1,100,000 and containing within the hollow cavity of said shells a gas inert to said copolymer; and a flexible envelope enclosing said material consisting of the microballoons and the bonding agent.

2. The padding according to claim 1 wherein said gas is air.

3. The padding according to claim 1 wherein said enclosing envelope is selected from the group of woven and nonwoven fabrics and film-forming materials.

4. The padding according to claim 1 wherein said envelope material is flame-retardant.

* * * * *